United States Patent
Shrivastava et al.

(10) Patent No.: US 11,014,431 B2
(45) Date of Patent: May 25, 2021

(54) ELECTRIFIED VEHICLE THERMAL MANAGEMENT SYSTEM

(71) Applicant: Ford Global Technologies, LLC, Dearborn, MI (US)

(72) Inventors: Rohan Shrivastava, Livonia, MI (US); Angel Fernando Porras, Dearborn, MI (US); Brett Allen Dunn, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 166 days.

(21) Appl. No.: 16/252,391

(22) Filed: Jan. 18, 2019

(65) Prior Publication Data
US 2020/0231024 A1    Jul. 23, 2020

(51) Int. Cl.
*B60H 1/32* (2006.01)
*B60H 1/00* (2006.01)

(52) U.S. Cl.
CPC ..... *B60H 1/00978* (2013.01); *B60H 1/00392* (2013.01); *B60H 1/00428* (2013.01); *B60H 1/00485* (2013.01); *B60H 1/00792* (2013.01); *B60H 1/00885* (2013.01); *B60H 1/00985* (2013.01); *B60H 1/3208* (2013.01); *B60H 1/3222* (2013.01); *B60H 2001/3238* (2013.01); *B60H 2001/3266* (2013.01); *B60H 2001/3273* (2013.01); *B60H 2001/3285* (2013.01); *B60H 2001/3292* (2013.01)

(58) Field of Classification Search
CPC ............ B60H 1/00978; B60H 1/00392; B60H 1/00428; B60H 1/00485; B60H 1/00792; B60H 1/00885; B60H 1/00985; B60H 1/3208; B60H 1/3222
See application file for complete search history.

(56) References Cited

U.S. PATENT DOCUMENTS

| 3,232,519 A |   | 2/1966  | Long      |              |
|-------------|---|---------|-----------|--------------|
| 3,967,644 A | * | 7/1976  | St. Laurent | F25B 49/022 137/512.1 |
| 5,044,168 A | * | 9/1991  | Wycoff    | G01F 23/14 62/126 |
| 5,168,854 A | * | 12/1992 | Hashimoto | G01M 15/08 123/406.17 |

(Continued)

*Primary Examiner* — Jonathan Bradford
(74) *Attorney, Agent, or Firm* — David B. Kelley; Brooks Kushman P.C.

(57) ABSTRACT

A vehicle thermal management system including a refrigerant circuit, a coolant circuit, a chiller, and a controller is provided. The refrigerant circuit may include an electric air conditioning (eAC) compressor and a pressure sensor. The coolant circuit may include a high-voltage battery. The chiller selectively thermally links the circuits. The controller may be programmed to, responsive to receipt of a sensor signal indicating refrigerant pressure exiting the eAC compressor is greater than a high threshold, output a pressure sensor fault error indicating the pressure sensor is faulty. The system may further include a timer to monitor operational timing of the eAC compressor. The controller may be further programmed to direct the system to operate without monitoring the eAC compressor responsive to the timer indicating the eAC compressor has been off for a time-period less than a time threshold reflective of the eAC compressor not being in an at rest state.

13 Claims, 3 Drawing Sheets

(56) References Cited

U.S. PATENT DOCUMENTS

| | | | | |
|---|---|---|---|---|
| 5,269,277 A | * | 12/1993 | Kuroda | F02M 25/0809 |
| | | | | 123/198 D |
| 6,615,594 B2 | | 9/2003 | Jayanth et al. | |
| 2002/0040280 A1 | * | 4/2002 | Morgan | B60H 1/00978 |
| | | | | 702/114 |
| 2002/0141877 A1 | | 10/2002 | Jayanth et al. | |
| 2004/0112070 A1 | * | 6/2004 | Schanin | G07F 9/02 |
| | | | | 62/132 |
| 2013/0002446 A1 | | 1/2013 | Smith et al. | |
| 2017/0341486 A1 | * | 11/2017 | Petrak | F04D 25/06 |
| 2018/0001784 A1 | * | 1/2018 | Porras | F25B 5/02 |

* cited by examiner

US 11,014,431 B2

ELECTRIFIED VEHICLE THERMAL MANAGEMENT SYSTEM

TECHNICAL FIELD

The present disclosure relates to a thermal management system for an electrified vehicle. The thermal management system includes components and programming to assist in identifying component faults during system operation.

BACKGROUND

A control module for a thermal management system may direct operation of an electric air conditioning (eAC) compressor based on inputs from an air conditioning (AC) pressure sensor which measures a high side pressure of a refrigerant line at an output of the eAC compressor. The high side pressure may indicate a net load on the thermal management system. For example, a high value may indicate a high load on the eAC compressor and would translate to a high current consumption by the eAC compressor, potentially impacting high-voltage battery cooling and cabin cooling. Under certain conditions, the eAC compressor may be prevented from operating, which may also impact high-voltage battery cooling and cabin cooling.

SUMMARY

A vehicle thermal management system includes a refrigerant circuit, a coolant circuit, a chiller, and a controller. The refrigerant circuit includes an electric air conditioning (eAC) compressor and a pressure sensor. The coolant circuit includes a high-voltage battery. The chiller selectively thermally links the circuits. The controller is programmed to, responsive to receipt of a sensor signal indicating refrigerant pressure exiting the eAC compressor is greater than a high threshold, output a pressure sensor fault error indicating the pressure sensor is faulty. The system may further include a timer to monitor operational timing of the eAC compressor. The controller may be further programmed to direct the system to operate without monitoring the eAC compressor responsive to the timer indicating the eAC compressor has been off for a time-period less than a time threshold reflective of the eAC compressor not being in an at rest state. The refrigerant circuit may further include a chiller shutoff valve and an expansion device upstream of the chiller. The controller may be further programmed to open the chiller shutoff valve based on a detected temperature value of the high-voltage battery. The refrigerant circuit may further include an evaporator, a cabin shutoff valve upstream of the evaporator, and an expansion device upstream of the evaporator. The controller may be further programmed to open the cabin shutoff valve based on a detected temperature value of a vehicle cabin in fluid communication with the refrigerant circuit. The controller may include an integrated timer to monitor operation of the eAC compressor. The controller may be further programmed to output a compressor fault error responsive to (i) detection of the timer indicating the eAC compressor has been off for a time-period reflective of the eAC compressor being in a rest state, (ii) detection of an eAC compressor pressure differential being less than a predetermined threshold, and (iii) calculation of an eAC compressor power output being less than a predetermined power threshold. The predetermined power threshold may be 1000 watts.

A vehicle thermal management system includes a first thermal loop, a second thermal loop, a chiller, and a controller. The first thermal loop includes a high-voltage battery and a first conduit to distribute coolant throughout the first thermal loop. The second thermal loop is in fluid communication with a vehicle cabin and includes an electric air conditioning (eAC) compressor to move refrigerant throughout the second thermal loop and a pressure sensor to monitor refrigerant pressure. The chiller thermally couples the first and second thermal loops. The controller directs operation of the thermal loops and programmed to, responsive to receipt of a cooling request, detection of the high-voltage battery not in a charge mode, detection of an eAC compressor refrigerant pressure below a performance threshold, and a eAC compressor power output being greater than a power threshold, output a sensor fault alert and direct the chiller to operate in an at rest mode. The system may further include a timer to monitor operation time of the eAC compressor. The timer may be in communication with the controller and the controller may be further programmed to, responsive to the timer indicating the eAC compressor has been off for a period of time reflective of the eAC compressor being in a rest state, output a command to initiate a first system check to identify whether the pressure sensor or the eAC compressor is operating with a fault condition or to initiate a second system check to identify whether a refrigerant level of the second thermal loop is below an acceptable level threshold. The controller may be further programmed to output an eAC compressor fault alert responsive to the calculated power output being less than the power threshold. The controller may be further programmed to, responsive to detection of the eAC compressor refrigerant pressure being outside of the performance threshold, initiate a second system check to identify whether a refrigerant level of the second thermal loop is within an acceptable level threshold. The controller may be further programmed to calculate a pressure delta between an initial refrigerant pressure and a final refrigerant pressure, and the controller may be further programmed to output a low refrigerant fault alert responsive to the pressure delta being less than a predetermined low-pressure threshold. The power threshold may be between two hundred and one thousand watts. The controller may be further programmed to output a first system check to identify whether the pressure sensor or the eAC compressor is operating with a fault condition responsive to detection of an ambient temperature being substantially between five and ten degrees Celsius.

A method to detect thermal management system faults includes, by a controller and responsive to detection of an electric air conditioning (eAC) compressor off-time being greater than a first predetermined threshold, no fault detected with regard to the eAC compressor, no fault detected with regard to a chiller shutoff valve, no fault detected with regard to a refrigerant pressure, detection of a high-voltage battery charge operation being off, and a detected ambient temperature being greater than a second predetermined threshold, outputting a command to calculate a pressure delta of the eAC compressor after key on and the eAC compressor is active and to calculate a power output of the eAC compressor. The controller is further programmed to, responsive to the calculated pressure delta being below a pressure delta threshold and the calculated power output being above a power threshold, outputting a first pressure sensor fault error. The method may further include, responsive to the calculated power output being below the power threshold, output, by the controller, an eAC compressor fault error. The method may further include, responsive to detection of a refrigerant pressure being greater than a pressure threshold, output, by the controller a second pressure sensor fault error indicating the pressure sensor is stuck in an operating state. The first predetermined threshold may be a time-period between ten and thirty seconds. The pressure delta threshold may be substantially equal to between 0.1 bars and 0.4 bars. The power threshold may be substantially equal to 1000 Watts.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
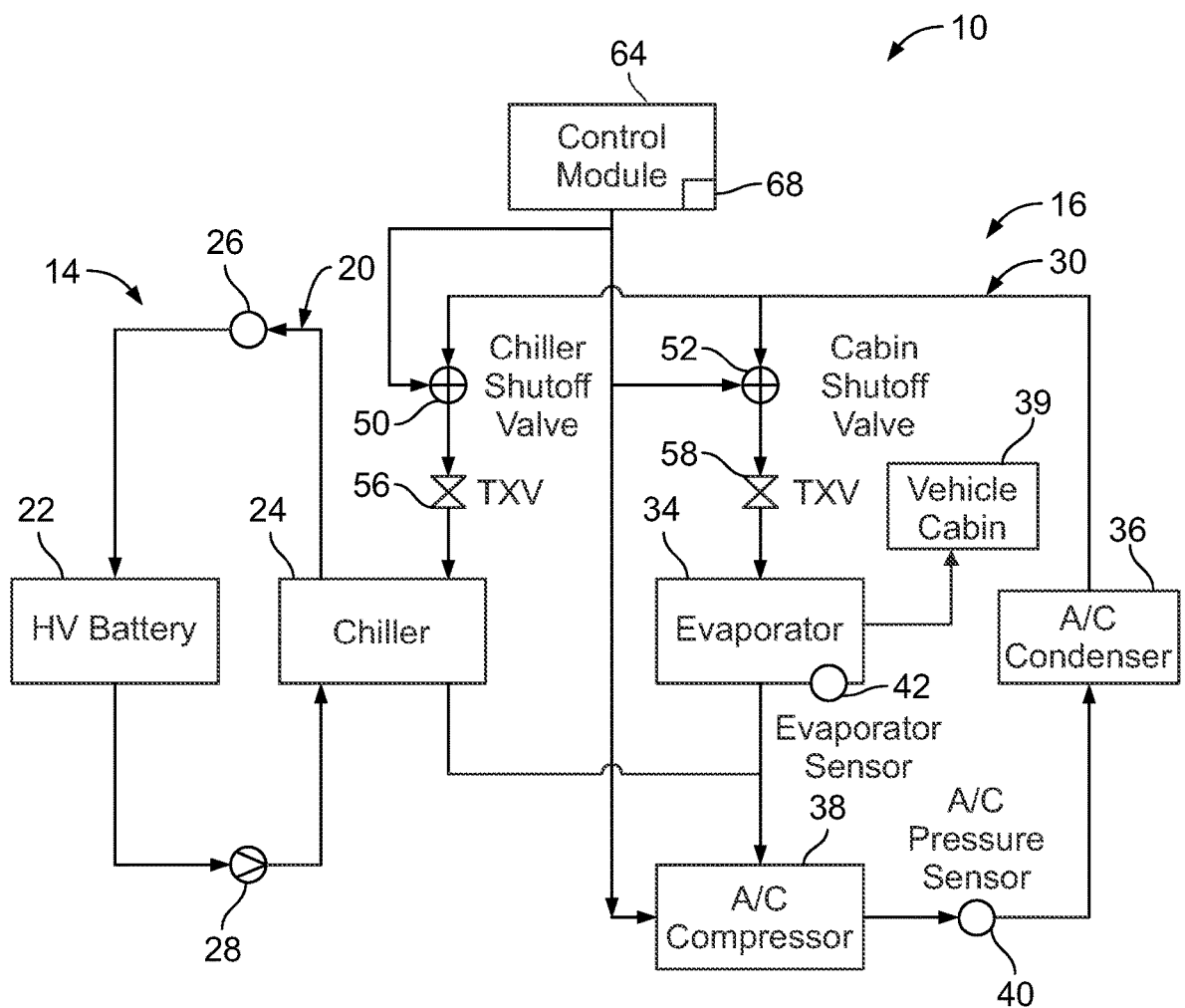
FIG. 1 is a schematic diagram illustrating an example of a vehicle thermal management system of an electrified vehicle.

FIG. 1 is a schematic diagram illustrating an example of a portion of a thermal management system for an electrified vehicle, referred to generally as a thermal management system 10 herein. The thermal management system 10 may assist in managing thermal conditions of vehicle operating components of the electrified vehicle. The thermal management system 10 includes a first thermal loop 14 and a second thermal loop 16 which may be selectively linked with one another. The first thermal loop 14 may also be referred to as a coolant circuit herein. The second thermal loop 16 may also be referred to as a refrigerant circuit herein. The first thermal loop 14 may include a first conduit 20 for coolant to flow between a high-voltage battery 22 and a chiller 24 such that the chiller 24 may assist in managing thermal conditions of the high-voltage battery 22. A temperature sensor 26 may monitor thermal conditions of the coolant within the first conduit 20 and a pump 28 may direct a flow of the coolant within the first conduit 20.

The second thermal loop 16 may include a second conduit 30 to facilitate a flow of refrigerant between components of the second thermal loop 16. The second thermal loop may be selectively thermally linked to the first thermal loop 14 via the chiller 24 and may include an evaporator 34, an air conditioning (AC) condenser 36, and an electric AC (eAC) compressor 38. Heat may be transferred between the coolant of the first thermal loop 14 and the refrigerant of the second thermal loop 16 via the chiller 24 based on a detected temperature of the coolant, a detected temperature of the high-voltage battery 22, a detected temperature of the refrigerant, and/or a detected pressure of the refrigerant. Depending on the detected temperatures or detected pressure, the coolant or refrigerant may be run through the chiller 24 to maintain acceptable thermal operating conditions of the high-voltage battery 22 and/or a vehicle cabin 39 within an optimal range.

The evaporator 34 may be in fluid communication with the vehicle cabin 39 to assist in managing thermal conditions thereof for passenger comfort. Optionally, the evaporator 34 may include a sensor (described below) to monitor temperature and pressure conditions of refrigerant flowing therethrough.

A pressure sensor 40 may be downstream of the eAC compressor 38 to monitor a pressure level of the refrigerant exiting the eAC compressor 38. The pressure sensor 40 may be in communication with a control module 64 (communication line not shown in FIG. 1) to send a signal when a refrigerant pressure is detected as being within or outside of a predetermined pressure threshold. An evaporator sensor 42 may monitor hydration and/or thermal conditions of the evaporator 34. The evaporator sensor 42 may be in communication with the control module 64 to provide signals reflecting a thermal condition of the evaporator 34. The control module 64 may then adjust output of components of the second thermal loop 16 to manage refrigerant pressure conditions and thermal conditions of the evaporator 34.

The second thermal loop 16 may include one or more valves to assist in managing refrigerant flow. For example, the second thermal loop 16 may include a chiller shutoff valve (CHSOV) 50, a cabin shutoff valve (CASOV) 52, a first thermal expansion valve (TXV) 56, and a second TXV 58. It is contemplated that each of the TXVs may be other types of expansion devices, such as an electronic expansion device. The CHSOV 50 may be selectively operated to control refrigerant flow to the chiller 24. The CASOV 52 may be selectively operated to control refrigerant flow to the evaporator 34. Each of the first TXV 56 and the second TXV 58 may operate to further control a refrigerant flow to the chiller 24 and the evaporator 34, respectively.

For example, each of the first TXV 56 and the second TXV 58 may be a passive control device. A bulb may be included within each of the TXVs to direct opening or closing based on a pressure and a temperature of the refrigerant. Each of the TXVs may selectively open when a temperature or a pressure of the refrigerant is detected to be within or outside of a predetermined threshold. Further, each of the TXVs may open to define different sized openings to assist in managing refrigerant flow based on the detected temperature or pressure of the refrigerant.

The control module 64 may be in communication with each of the components of the thermal management system 10 to direct operation thereof. The control module 64 may also be referred to as a controller herein. The control module 64 may be programmed to execute one or more control strategies to manage operation of the thermal management system 10. In one example, the control module 64 may monitor refrigerant flow and component operation within the second thermal loop 16 to detect system faults which may result in underperformance of the chiller 24 or the eAC compressor 38. This underperformance may negatively impact thermal management of the high-voltage battery 22 and/or the vehicle cabin 39.

Previous thermal management systems measured an AC pressure sensor on a high side of an eAC compressor to identify eAC compressor output. The high side pressure is an indication of load on a system. For example, a high value of the high side pressure may indicate a high load on the eAC compressor, e.g. high current consumption by the eAC compressor. A low value of the high side pressure may indicate a low amount of refrigerant in the system. In the event the high side pressure is a value between a high threshold and a low threshold, the previous thermal management system deactivates the eAC compressor for protection. In this example, the high threshold may be between twenty-five and thirty bars and the low threshold may be between two and four bars. However, the previous thermal management system may miss a fault in the system and incorrectly identify the eAC compressor as faulty in this example.

In the event of faulty wiring in the previous thermal management system between the AC pressure sensor and a system controller, the pressure sensor may read a fixed value and the controller may be unable to detect faults if the fixed value is within thresholds of normal operating conditions. If the controller receives an incorrect value and disables the eAC compressor for protection, chiller operation may be inhibited which would negatively impact thermal management efforts relating to a high-voltage battery in fluid communication with the chiller.

In the event of a system hardware failure in the previous thermal management system in which the eAC compressor was operating as commanded but with little or no power consumption, the controller may identify there is no work output from the eAC compressor and thus the chiller will not be effective in assisting in managing thermal conditions of the high-voltage battery with input from the eAC compressor. In contrast to the previous thermal management systems, the thermal management system 10 includes programming to accurately identify operating faults of the eAC compressor 38 to detect operational faults in the second thermal loop 16 such that thermal management of the high-voltage battery 22 and the vehicle cabin 39 is maintained.

For example, the control module 64 may include or be in communication with a timer 68. The timer 68 may be in communication with the eAC compressor 38 to monitor operating times thereof. The timer 68 may be used to monitor an amount of time the eAC compressor 38 is off to allow a refrigerant pressure to settle to an at rest state in which pressure changes due to other system operations are clearly visible. In this example, a refrigerant pressure of the at rest state may be between five and eight bars. Once the eAC compressor 38 has been turned off for a predetermined time-period reflective of an amount of time for the refrigerant to reach the at rest state, the timer 68 may send a signal to the control module 64 indicating that same.

In the event the control module 64 receives a cool request relating to the high-voltage battery 22 and/or the vehicle cabin 39, the control module 64 may respond by executing a first system check to identify whether a pressure sensor is operating properly and to identify whether the eAC compressor 38 is operating properly. The control module 64 may initiate the first system check at predefined time intervals or upon detection of a triggering event, such as a vehicle start. In the event the control module 64 receives one or more signals indicating the pressure sensor 40 detects a pressure value between a high-pressure threshold and a low-pressure threshold, the control module 64 may identify the eAC compressor 38 as "stuck" and/or operating under a fault condition as further described herein.

Previous thermal management systems may incorrectly identify a pressure value between the high-pressure threshold and the low-pressure threshold as representative of the system running as desired. However, a pressure value between the high-pressure threshold and the low-pressure threshold may be a result of a hardware failure or a low amount of refrigerant within the system that previous thermal management systems are not able to identify.

The control module 64 may further respond by initiating a second system check to identify whether a pressure of the refrigerant is within acceptable operating conditions based on a detected power output of the eAC compressor 38 as further described herein. The second system check may also identify whether a pressure sensor is operating properly.

As such, the thermal management system 10 may operate to identify system faults related to compressor performance, system faults related to system sensors, and system faults related to a refrigerant level within the second thermal loop 16. Previous thermal management systems were not able to accurately detect these system faults.

Figure 2:
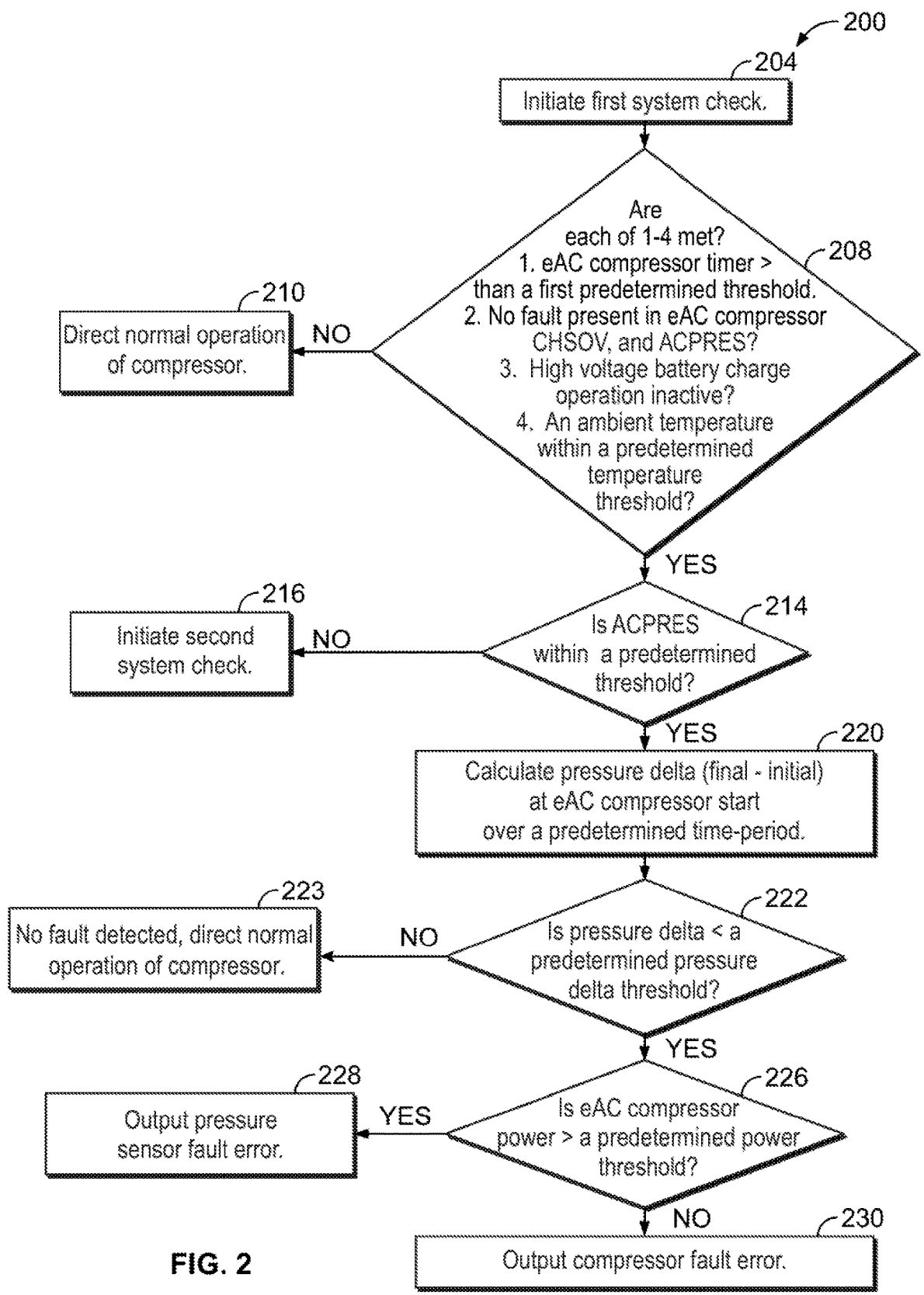
FIG. 2 is a flow chart illustrating an example of a control strategy for a vehicle thermal management system of an electrified vehicle.

FIG. 2 illustrates an example of a control strategy to direct operation of a thermal management system for an electrified vehicle, referred to generally as a control strategy 200 herein. The control strategy 200 may operate to identify system faults which result in inhibiting chiller operation or result in an underperformance of an eAC compressor, both of which may negatively impact high-voltage battery and vehicle cabin thermal management operations.

The control strategy 200 may be used with, for example, the thermal management system 10 to assist in identifying system fault conditions. In operation 204, a controller, such as the control module 64, may initiate a first system check. In operation 208, the control strategy 200 may operate and initiate the first system check to identify whether preidentified variables are operating within acceptable thresholds. Examples of the preidentified variables include an eAC compressor timer status, an eAC compressor status, a CHSOV status, a refrigerant pressure status, a high-voltage battery charge operation status, and an ambient temperature status. For example, the controller may identify whether the eAC compressor timer is at a time greater than a predetermined time threshold, whether a fault condition is present in the eAC compressor, the CHSOV, and/or an air conditioning pressure (ACPRES), whether a high-voltage battery charge operation is active, and whether an ambient temperature is within a predetermined temperature threshold.

The predetermined time threshold relating to the eAC compressor timer may be a time-period between twenty minutes and one hundred twenty minutes. A fault condition related to the eAC compressor, such as the eAC compressor 38, may relate to an amount and rate of refrigerant flowing through the eAC compressor within the thermal management system. A fault condition related to the CHSOV, such as the CHSOV 50, may be related to whether a coolant loop and a refrigerant loop should be thermally linked to assist one another in managing thermal conditions of a high-voltage battery and a vehicle cabin based on received requests and system conditions. A fault condition related to the ACPRES may be related to a detected amount of refrigerant pressure reflective of work output of the eAC compressor. The predetermined temperature threshold relating to ambient temperatures may be a temperature between five and ten degrees Celsius.

In the event that the system identifies that one or more of the predetermined variables are outside of a respective acceptable condition, the control strategy 200 may indicate no system fault conditions are present and direct the compressor to operate normally and direct the system to operate without system monitoring in operation 210. The control strategy 200 may then optionally direct the system to return to operation 208. In the event that the system identifies that each of the following four conditions is met, 1. eAC compressor timer>than a first predetermined threshold, 2. no fault is detected in the eAC compressor, CHSOV, and ACPRES, 3. a high-voltage battery charge operation is inactive, and 4. an ambient temperature>than a second predetermined threshold, the control strategy 200 may then examine pressure readings related to the eAC compressor in operation 214.

For example, the controller may identify whether refrigerant exiting the eAC compressor has a pressure within an acceptable threshold. The acceptable threshold may be defined between a low-pressure threshold and a high-pressure threshold. In one example, the low-pressure threshold may be a pressure value between two and six bars and the high-pressure threshold may be a pressure value between thirteen and eighteen bars.

In the event the refrigerant pressure is identified as within the acceptable threshold, in operation 214, the controller may direct calculation of a pressure delta between an operational start, such as a key on operation, of the eAC compressor and conclusion of a predetermined time-period in operation 220. The acceptable pressure threshold may be a pressure range selected based on optimal thermal performance of a refrigerant loop. The pressure delta may be substantially equal to a difference between an initial refrigerant pressure value and a final refrigerant pressure value. The predetermined time-period may be equal to between ten and thirty seconds. In the event that the refrigerant pressure is outside the acceptable pressure threshold, the controller may initiate a second system check in operation 216 and as further described in relation to FIG. 3 below.

In operation 222, the controller may identify whether the calculated pressure delta is less than a predetermined pressure delta threshold. In one example, the predetermined pressure delta threshold may be equal to between 0.1 and 0.4 bars. If the calculated pressure delta is more than the predetermined pressure delta threshold, the control strategy 200 may indicate that no fault condition is present and direct normal operation of the eAC compressor in operation 223.

If the calculated pressure delta is less than the predetermined pressure delta threshold, the control strategy may then direct calculation of whether eAC compressor power is greater than a predetermined power threshold in operation 226. In one example, the predetermined power threshold may be equal to between two hundred and one thousand watts. In the event that the calculated eAC compressor power is greater than the predetermined power threshold, the controller may output a pressure sensor fault error in operation 228. In the event that the calculated eAC compressor power is less than the predetermined power threshold, the controller may output a compressor performance fault error in operation 230.

Figure 3:
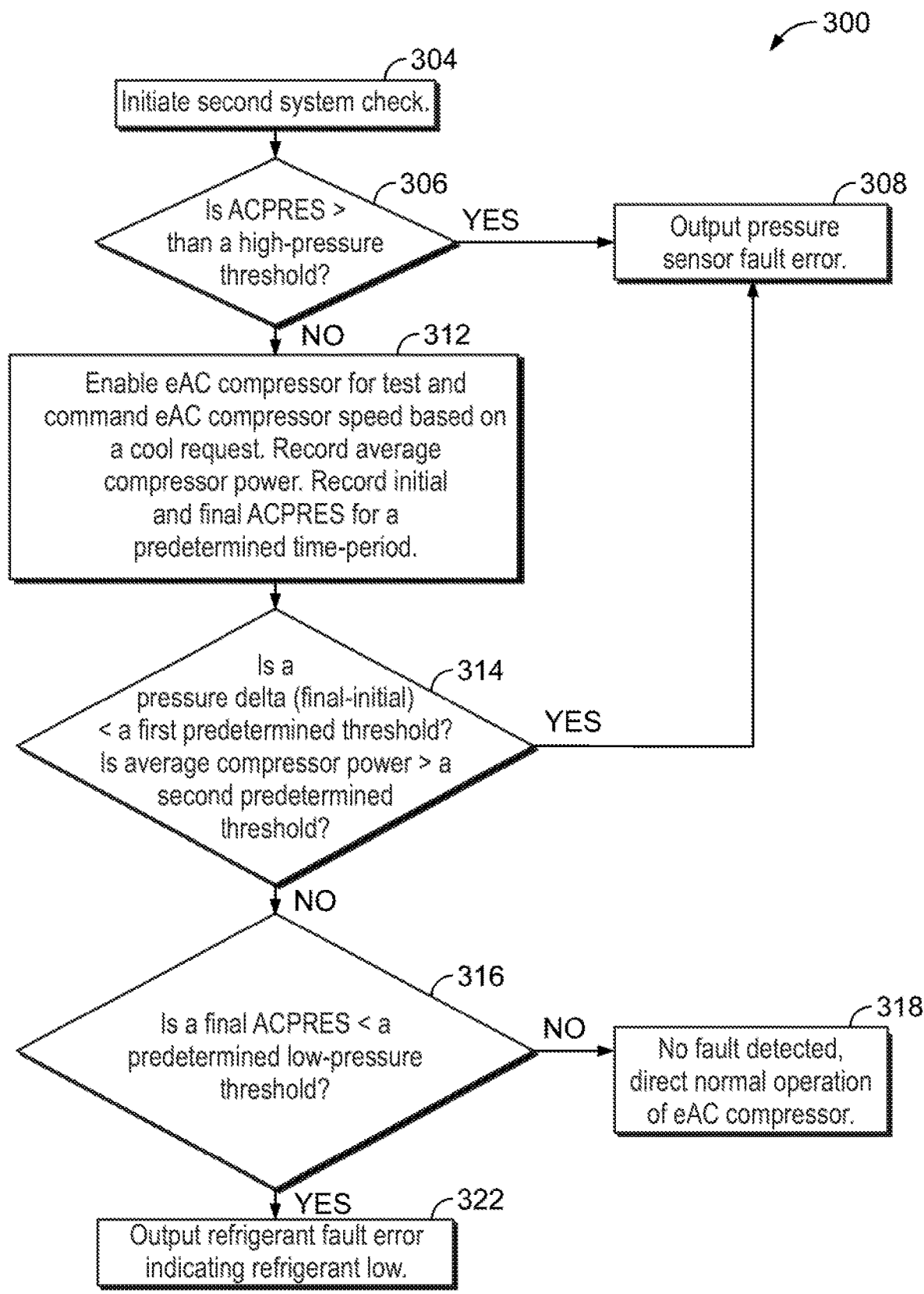
FIG. 3 is a flow chart illustrating another example of a control strategy for a vehicle thermal management system of an electrified vehicle.

FIG. 3 illustrates an example of a control strategy to direct operation of a thermal management system for an electrified vehicle, referred to generally as a control strategy 300 herein. The control strategy 300 may operate to identify system faults which result in inhibiting chiller operation or result in an underperformance of an eAC compressor, both of which may negatively impact high-voltage battery and vehicle cabin thermal management operations. The control strategy 300 may complementarily operate with the control strategy 200 to identify system faults.

The control strategy 300 may be used with, for example, the thermal management system 10 to identify whether a refrigerant level is within an acceptable threshold and whether pressure sensors are operating properly. In operation 304, a controller, such as the control module 64, may initiate an ACPRES check to identify a pressure value of refrigerant running through a corresponding thermal loop, such as the second thermal loop 16. If the controller identifies that the ACPRES is greater than a predetermined high-pressure threshold in operation 306, the controller may direct output of a pressure sensor fault error in operation 308. In one example, the high-pressure threshold may be substantially equal to between fifteen and seventeen bars. If the controller identifies that the ACPRES is less than the high-pressure threshold, the controller may enable an eAC compressor for a test and command the eAC compressor operate at a speed based on a high-voltage battery or vehicle cabin cool request in operation 312.

For example, the controller may calculate and record an average power of the eAC compressor and record an initial and a final ACPRES for a predetermined time-period. In operation 314, the controller may calculate a refrigerant pressure delta (e.g. final-initial) and a power of the eAC compressor. In the event the pressure delta is less than a first predetermined threshold and the power value is greater than a second predetermined threshold, the controller may direct output of the pressure sensor fault error in operation 308. In one example, the first predetermined threshold may be substantially equal to between 0.1 and 0.4 bars and the second predetermined threshold may be substantially equal to between two hundred and one thousand watts.

In the event the pressure delta is greater than the first predetermined threshold and/or the power is less than the second predetermined threshold in operation 314, the controller may then identify whether the final ACPRES is less than a predetermined low-pressure threshold in operation 316. In one example, the predetermined low-pressure threshold is substantially equal to three to five bars.

In the event the controller identifies the final ACPRES as more than the predetermined low-pressure threshold in operation 316, the controller may indicate no fault is detected and direct normal operation of the eAC compressor in operation 318. In the event the controller identifies the final ACPRES as less than the predetermined low-pressure threshold in operation 316, the controller may indicate a refrigerant level of the system is low and direct output of a refrigerant fault error in operation 322.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle thermal management system comprising:
 a refrigerant circuit including an electric air conditioning (eAC) compressor and a pressure sensor;
 a coolant circuit including a battery;
 a chiller to selectively thermally link the circuits; and
 a controller programmed to, responsive to receipt of a sensor signal indicating refrigerant pressure exiting the eAC compressor is greater than a pressure threshold, output a pressure sensor fault error indicating the pressure sensor is faulty wherein the controller includes an integrated timer to monitor operation of the eAC compressor, and wherein the controller is further programmed, after start of the eAC compressor, to output a compressor fault error responsive to (i) detection of the timer indicating the eAC compressor has been off for a time-period reflective of the eAC compressor being in a rest state, (ii) detection of an eAC compressor pressure differential being less than a predetermined threshold, and (iii) calculation of an eAC compressor power output being less than a predetermined power threshold.

2. The system of claim 1, wherein. the refrigerant circuit further includes a chiller shutoff valve and an expansion device upstream of the chiller, and wherein the controller is further programmed to open the chiller shutoff valve based on a detected temperature value of the battery.

3. The system of claim. 1, wherein the refrigerant circuit further includes an evaporator, a cabin. shutoff valve upstream of the evaporator, and an expansion device upstream of the evaporator, and wherein the controller is further programmed to open the cabin shutoff valve based on a detected temperature value of a vehicle cabin in fluid communication with the refrigerant circuit.

4. The system of claim 1. wherein the predetermined power threshold is 1000 watts.

5. A vehicle thermal management system. comprising:
 a first thermal loop including a battery and a first conduit to distribute coolant throughout the first thermal loop;
 a second thermal loop in fluid communication with a vehicle cabin. and including an electric air conditioning (eAC) compressor to move refrigerant throughout the second thermal loop and a pressure sensor to monitor refrigerant pressure;
 a chiller to thermally couple the first and second thermal loops; and
 a controller to direct operation of the thermal loops and programmed to, responsive to receipt of a cooling request, detection. of the battery not in a charge mode, detection of an eAC compressor refrigerant pressure below a performance threshold, and a eAC compressor power output being greater than a power threshold, output a sensor fault alert and direct the chiller to operate in an at rest mode; and wherein the system further comprises a timer to monitor operation time of the eAC compressor, wherein the timer is in communication with the controller, and wherein the controller is further programmed to, after start of the eAC compressor and responsive to the timer indicating the eAC compressor has been off for a period of time reflective of the eAC compressor being in a rest state, output an eAC compressor fault alert responsive to the eAC compressor power output being less than the power threshold.

6. The system of claim 5, wherein the controller is further programmed to, responsive to the timer indicating the eAC compressor has been off for the period of time reflective of the eAC compressor being in a rest state, output a command to initiate a first system check to identify whether the pressure sensor or the eAC compressor is operating with a fault condition or to initiate a second system check to identify whether a refrigerant level of the second thermal loop is below an acceptable level threshold.

7. The system of claim 5, wherein the controller is further programmed to, responsive to detection of the eAC compressor refrigerant pressure being outside of the performance threshold, initiate a system check to identify whether a refrigerant level of the second thermal loop is within an acceptable level threshold.

8. The system of claim 5, wherein. the controller is further programmed to calculate a pressure delta between an initial refrigerant pressure and a final refrigerant pressure, and wherein the controller is further programmed to output a low refrigerant fault alert responsive to the pressure delta being less than a predetermined low-pressure threshold.

9. The system of claim 5, wherein the power threshold is between two hundred and one thousand watts.

10. A method to detect thermal management system faults comprising:
 by a controller,
  responsive to detection of an electric air conditioning (eAC) compressor off-time being greater than a first predetermined threshold, no fault detected with regard to the eAC compressor, no fault detected with regard to a chiller shutoff valve, no fault detected with regard to a refrigerant pressure, detection of a high voltage battery charge operation being off, and a detected ambient temperature being greater than a second predetermined threshold, outputting a command to calculate a pressure delta of the eAC compressor after key on and the eAC compressor is active and to calculate a power output of the eAC compressor;
  responsive to the calculated pressure delta being below a pressure delta threshold and the calculated power output being above a power threshold, outputting a first pressure sensor fault error; and responsive to the calculated pressure being below the pressure delta threshold and the calculated power output being below the power threshold, outputting an eAC compressor fault error.

11. The method of claim 10, wherein the first predetermined threshold is a time-period between ten and thirty seconds.

12. The method of claim 10, wherein the pressure delta threshold is between 0.1 bars and 0.4 bars.

13. The method of claim 10, wherein the power threshold is 1000 Watts.

* * * * *